Nov. 19, 1963  A. R. FJERMESTAD  3,111,112
COMBINED MILK LINE RELEASER AND WASHER ASSEMBLY
Filed Feb. 6, 1961  2 Sheets-Sheet 1

INVENTOR.
Arnold R. Fjermestad
BY  Everett J. Schroeder

United States Patent Office 3,111,112
Patented Nov. 19, 1963

3,111,112
COMBINED MILK LINE RELEASER AND
WASHER ASSEMBLY
Arnold R. Fjermestad, Albert Lea, Minn., assignor to National Cooperatives, Inc., Albert Lea, Minn., a corporation of the District of Columbia
Filed Feb. 6, 1961, Ser. No. 87,226
6 Claims. (Cl. 119—14.07)

This invention relates to milking machines and their milk line assemblies. More particularly it relates to milk line releasers and means for washing the same.

It has become quite conventional in the operation of milking machines to conduct the milk to a central elevated milk line within the barn or milking parlor and convey the milk thereby to a central location at which point it is discharged into a receiving or bulk tank by means of apparatus commonly known as milk line releasers. One of the obvious problems associated with this practice is that of maintaining the interior of such as system in a sanitary condition, particularly in view of the fact that milk offers an almost ideal area for growth of bacteria. It is desirable, therefore, if possible, to provide a simple and effective means of washing such an assembly with a minimum of effort and inconvenience while assuring a complete and effective washing operation. Obviously, it is simply impractical to disassemble such an assembly in order to wash the same. My invention is directed toward solving this problem.

It is a general object of my invention to provide a combined milk line releaser and washer assembly which is simple and inexpensive in manufacture and operation.

A more specific object is to provide a novel combination and arrangement of parts of a milk line releaser with certain slight modifications which enables the milk line releaser assembly to provide its own washing operation.

Another object is to provide a novel and improved milk line assembly which can be quickly and easily converted into its own washer assembly to accomplish the washing operation with a minimum of time, expense, and inconvenience as well as labor.

Another object is to provide a novel combined milk line releaser and washer assembly wherein an improved washing operation is accomplished.

Another object is to provide a novel and improved combined milk line releaser and washer assembly which requires a bare minimum of additional parts to supplement the conventional milk line releaser in order to provide the washing function and wherein these parts are capable of adjustment such as to improve the operation of the milk line releaser under certain conditons which heretofore have constituted a problem for milk line releasers.

Another object is to provide a novel and improved combined pulsator and air regulator which is compact, inexpensive to manufacture and operate, and provides the releaser and washer control with high effectiveness and efficiency at a minimum of operational expense.

These and other objects and advantages of my invention will more fully appear from the following description, made in connection with the accompanying drawings, wherein like reference characters refer to the same or similar parts throughout the several views, and in which.

Figure 1:
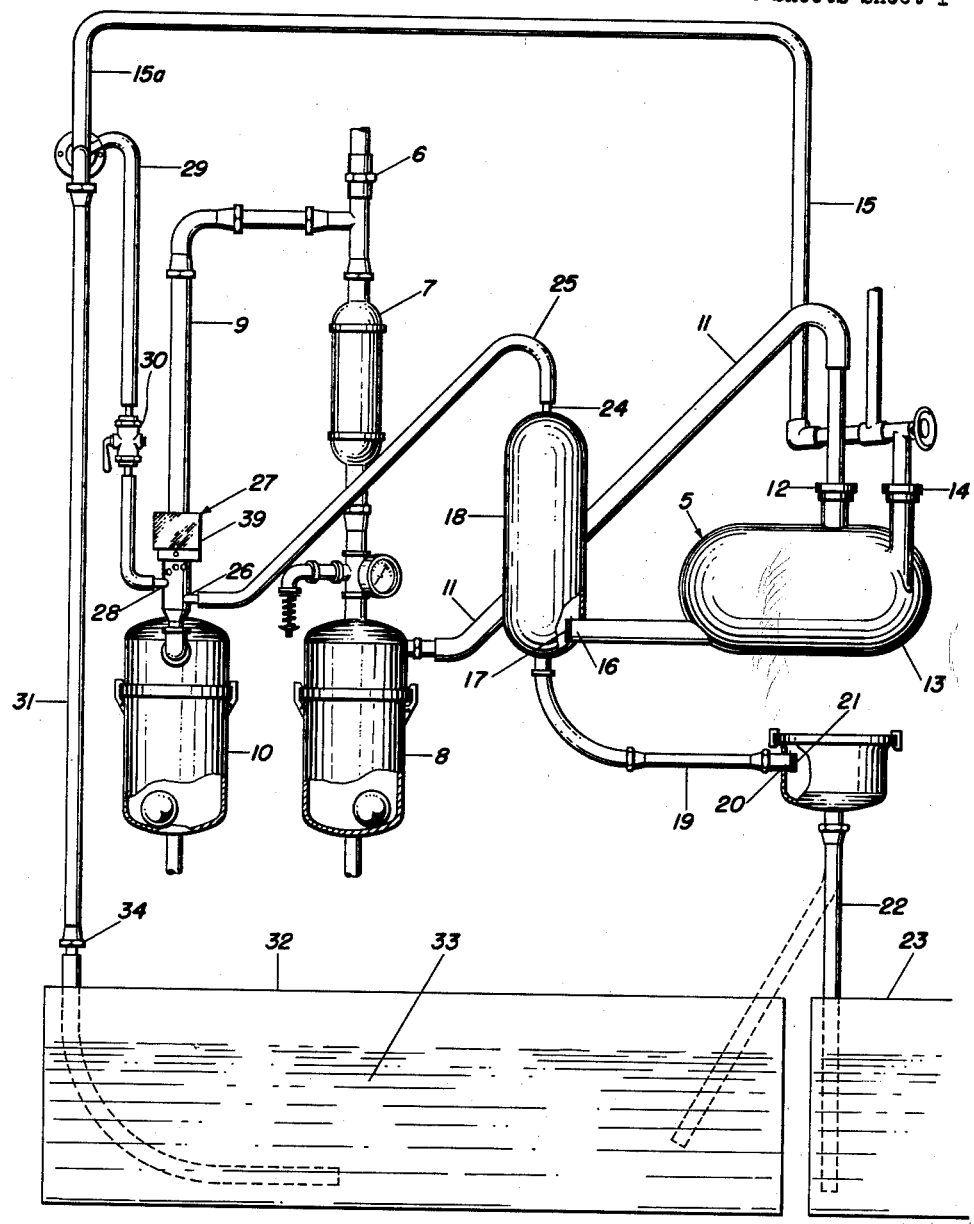
FIG. 1 is a front elevational view of one embodiment of my invention showing the milking operation in solid lines and the washing operation in broken lines.
Figure 2:
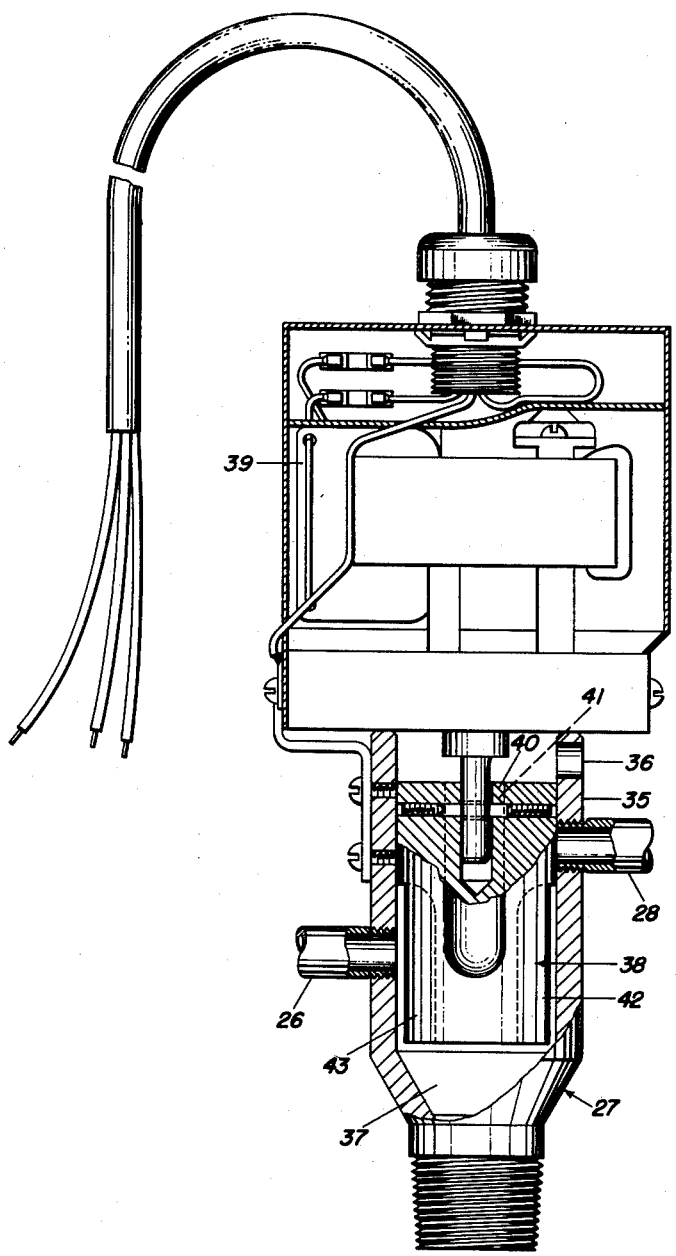
FIG. 2 is a vertical sectional view of my combined pulsator and air regulator.

One embodiment of my invention as shown in FIGS. 1–2, includes a releaser assembly indicated generally by the numeral 5 which is activated and controlled by manipulation of suction which originates with a source of suction such as a vacuum pump (not shown) connected to a conduit 6. The valve means 7 is interposed between the source of suction 6 and the low vacuum moisture trap 8. The valve 7 is preferably of the type shown in FIG. 3 of U.S. Letters Patent No. 2,775,223 or some suitable substitute which is adapted to maintain the pressure within the low pressure moisture trap 8, 2–3 inches below that of the source of vacuum which is preferably about 14 inches. A conduit 9 connects the source of vacuum 6 to a high vacuum moisture trap 10.

The low vacuum moisture trap 8 is connected by a suction tube 11 to the vacuum inlet 12 of a milk receiving chamber 13. The milk receiving chamber 13 has a milk inlet 14 which is connected to one end of a milk line 15 so as to receive milk therefrom. The milk line 15 is connected to a plurality of individual milking assemblies (not shown) along the length of the line in the conventional manner. The milk receiving chamber 13 also has a milk outlet 16 which is provided with a pressure sensitive flapper type valve 17 which is constructed and arranged to close when the suction within the milk receiving chamber 13 is greater than that exterior of that chamber in a manner similar to the milk receiving chamber described in U.S. Letters Patent No. 2,775,223.

The releaser assembly 5 also includes a milk delivering chamber 18 which is extended by means of pipe 19 and has a milk discharge outlet 20. A pressure sensitive flapper type valve 21 opens and closes the milk discharge outlet 20 and is constructed and arranged to close the outlet 20 when the pressure within the milk delivering chamber 18 is less than atmospheric conditions and to open the discharge outlet under the effects of gravity upon the milk within the milk delivering chamber 18 when the pressure is equal on both sides of the valve. A flexible conduit 22 carries the milk into the open tank 23 at which point the milk is stored and cooled.

The milk delivering chamber 18 has a vacuum inlet 24 which is connected by a suction tube 25 to one port 26 of a combined pulsator and air regulator indicated generally by the numeral 27. A second port 28 is connected by an air tube 29 to the opposite end 15a of the milk line 15. The manual valve 30 is interposed within the air tube 29 to enable the operator to interrupt the flow of air through the tube 29 at will.

The opposite end 15a of the milk line 15, as shown, is adapted to be connected by an extension 31 to a flush tank 32. Within the flush tank 32 is a quantity of cleaning fluid 33. A cap (not shown) is provided for attachment to the lower end of the upper portion of the extension 31 to close off the extension by threaded attachment thereto as at 34.

The details of the combined pulsator and air regulator 27 are shown on an enlarged scale in FIG. 2. It includes a substantially closed body 35 which has a substantially hollow cylindrical interior which is provided with an air inlet 36 adjacent its upper end and a suction inlet 37 at its lower end which, as shown, is connected to the high vacuum moisture trap 10. Mounted for rotation about its longitudinal axis within the hollow interior of the body 35 is a cylindrical valve element 38 which is driven by a 6 r.p.m. motor 39. The valve element 38 is provided with a pair of axially extending air passages 40 and 41 which extend downwardly from the upper end of the valve element and are in continuous communication with the air inlet 36. At second pair of axially extending passages 42 and 43 extend upwardly from the lower end of the valve element 38 and terminate slightly above the port 26 but below the port 28. Each of the passages 42 and 43 is formed in the peripheral portions only of the cylindrical valve element 38 as are the two passages 40 and 41. The latter two passages terminate at a position opposite the port 26 so as to bring that port into communication intermittently with the inlet 36 as the valve element rotates.

The assembly shown in solid lines in FIG. 1 illustrates the arrangement of the parts thereof during the milking operation. As the milk is fed into the milk line 15 from the various individual milking units positioned along its length throughout the barn or milking parlor, the milk is drawn upwardly and along the length of the milk line 15 into the milk receiving chamber 13. The electric motor 39 which rotates at 6 r.p.m.'s turns the valve element 38 and causes the interior of the milk delivering chamber 18 is communicate with the high vacuum of the high vacuum moisture trap 10 intermittently and thereby intermittently cause the milk delivering chamber 18 to be maintained at a lower pressure than that with within the milk receiving chamber 13. During such periods the flapper valve 17 will be drawn to open position and the milk will drain out of the milk receiving chamber 13 and be drawn into the milk delivering chamber 18. As the valve element 38 continues to rotate the tube 25 will be cut off from the source of suction 6 and be connected via one of the passages 40, 41 to the atmosphere and air will thereupon enter the interior of the milk delivering chamber 18. When this takes place the valve element 21 is no longer retained in closed position as is the case when the interior of the milk delivering chamber 18 is under suction and hence the milk will flow by action of gravity outwardly through the milk discharge outlet 20 and through the conduit 22 into the bulk tank 23. While this is taking place, of course, suction is being applied to the interior of the milk receiving chamber 13 via the suction tube 11 and hence valve 17 is closed and the supply of milk within the chamber 13 is replenished. This is conventional for the operation of releaser assemblies except that I utilize a different type of pulsator for intermittently introducing air and suction into the assembly.

In the operation of releaser assemblies it frequently, however, happens that the milk line becomes filled or loaded to an excessive extent with milk. This occurs in the event too many milking units are applied to one milk line or in the event a filter becomes clogged. Such conditions will cause the milk line to become overloaded or substantially filled and as a result the suction will be unable to move the milk along the line. In such an event I partially open the valve 30 which will cause air to be spasmodically introduced into the opposite end 15a of the milk line and cause the milk to be moved along the line to the releaser assembly by the periodic injection of small volumes of air through the valve passages 40 and 41 as they communicate with the port 28.

When the milking operation has been completed it is a very simple operation to wash out the interior of the entire line with my assembly. To accomplish this I merely remove the cap from the lower end of the extension 31 so that the extension will communicate with the supply of cleaning fluid in the flush tank 32. I then swing the conduit 22 away from the bulk tank and cause it to communicate with the flush tank 32 so as to return the supply of cleaning fluid thereinto. I then open the valve 30 (which normally remains closed during the milking operation) and the washing operation will immediately commence upon the application of suction from the source of suction 6. The cleaning fluid 33 will be drawn upwardly through the milk line 15 into the milk receiving chamber 13 and thence into the milk delivering chamber 18 and thence through the conduit 22 back into the flush tank 32. As the cleaning fluid flows through the milk line periodic injections of air will be introduced into the flow of cleaning fluid and these spasmodic injections induce great turbulence within the cleaning fluid and greatly increase the efficiency of the cleaning action. As a result the entire milk line and releaser assembly can be quickly and efficiently cleaned with a minimum of effort, inconvenience, and expense. It will be noted that my combined pulsator and air regulator is extremely simple in construction and operation and is inexpensive to manufacture and utilize while providing an increased efficiency in the milking and washing operation.

It will, of course, be understood that various changes may be made in the form, details, arrangement and proportions of the parts without departing from the scope of my invention which consists of the matter shown and described herein and set forth in the appended claims.

What is claimed is:

1. A combined milk line releaser and washer assembly comprising a milk line, a milk receiving chamber having a milk inlet connected to one end portion of said milk line and receiving therefrom and having a vacuum inlet and a milk outlet, a source of vacuum connected with said vacuum inlet, means interposed between said source of vacuum and said vacuum inlet maintaining the vacuum within said chamber at a lower value than at said source of vacuum, a pressure sensitive valve element extending across said outlet and opening and closing the same, a milk delivering chamber connected to said outlet in milk-receiving relation and having a milk discharge outlet and having a vacuum inlet connected to said source of vacuum, a pressure sensitive valve extending across said milk discharge outlet and opening and closing the same, a single control mechanism connected with said source of vacuum and the vacuum inlet of said milk delivering chamber for causing said vacuum to be applied to the interior of said milk delivery chamber and having free air passages which are connected with said interior alternately relative to said source of vacuum at spaced intervals, and means for connecting said milk line adjacent its opposite end with a source of cleaning fluid as desired, said free air passages of said mechanism being also connected with said milk line adjacent its said opposite end for intermittently introducing air into the flow of said cleaning fluid through said milk line when said milk line is so connected with said source of cleaning fluid.

2. A combined milk line releaser and washer assembly comprising a milk line, a milk receiving chamber having a milk inlet connected to one end portion of said milk line and receiving therefrom and having a vacuum inlet and a milk outlet, a source of vacuum connected with said vacuum inlet, means interposed between said source of vacuum and said vacuum inlet maintaining the vacuum within said chamber at a lower value than at said source of vacuum, a pressure sensitive valve element extending across said outlet and opening and closing the same, a milk delivering chamber connected to said outlet in milk-receiving relation and having a milk discharge outlet and having a vacuum inlet connected to said source of vacuum, a pressure sensitive valve extending across said milk discharge outlet and opening and closing the same, a single control mechanism connected with said source of vacuum and the vacuum inlet of said milk delivering chamber for alternately causing said vacuum to be applied to the interior of said milk delivery chamber and introducing air thereinto, and means for connecting said milk line adjacent its opposite end with a source of cleaning fluid as desired, said mechanism being also connected with said opposite end of said milk line for intermittently introducing air into the flow of such cleaning fluid through said milk line when said milk line is so connected with said source of cleaning fluid.

3. The structure defined in claim 2 wherein said mechanism constitutes pulsator mechanism alternately connecting said milk delivering chamber with said source of vacuum and free air and intermittently introducing air into said opposite end portion of said milk line into the flow said cleaning fluid through said milk line when said milk line is so connected with said source of cleaning fluid.

4. The structure defined in claim 2 wherein said mechanism is comprised of a rotary mechanical pulsator which connects said milk-delivering chamber alternately with said source of suction and free air and intermittently connects said opposite end portion of said milk line with free air when said milk line is so connected with said source of cleaning fluid and at a time other than when free air is admitted into said milk-delivering chamber.

5. A combined milk line releaser and washer assembly comprising a milk line, a milk receiving chamber having a milk inlet connected to one end portion of said milk line and receiving therefrom and having a vacuum inlet and a milk outlet, a source of vacuum connected with said vacuum inlet, means interposed between said source of vacuum and said vacuum inlet maintaining the vacuum within said chamber at a lower value than at said source of vacuum, a pressure sensitive valve element extending across said outlet and opening and closing the same, a milk delivering chamber connected to said outlet in milk-receiving relation and having a milk discharge outlet and having a vacuum inlet connected to said source of vacuum, a pressure sensitive valve extending across said milk discharge outlet and opening and closing the same, rotary pulsator mechanism interposed between said source of vacuum and the vacuum inlet of said milk delivering chamber and connecting said milk delivering chamber alternately with said source of vacuum and the free atmosphere, means for connecting said milk line adjacent its opposite end with a source of cleaning fluid as desired, and conduit means connecting said opposite end portion of said milk line with said pulsator mechanism, said pulsator mechanism including a rotary valve element having air passages and suction passages formed therein, said conduit means being connected to said pulsator mechanism in fluid communication with only said air passages of said pulsator mechanism and conveying air therefrom to said opposite end portion and into the flow of cleaning fluid in said milk line when said milk line is so connected with source of cleaning fluid.

6. The structure defined in claim 5 and valve means interposed within said conduit means for connecting and disconnecting said opposite end portion of said milk line with free atmosphere when and as desired as said valve element rotates.

References Cited in the file of this patent
UNITED STATES PATENTS

| | | |
|---|---|---|
| 1,562,770 | Jamieson | Nov. 24, 1925 |
| 2,655,168 | Henrard | Apr. 8, 1949 |
| 2,775,223 | Pickavance | Dec. 25, 1956 |
| 2,786,445 | Golay | Mar. 26, 1957 |
| 2,818,076 | Erling | Dec. 31, 1957 |
| 2,898,937 | Williams | Aug. 11, 1959 |